UNITED STATES PATENT OFFICE.

GEORGE DELIUS AND CHARLES P. TATRO, OF SEATTLE, WASHINGTON.

PRESERVING MEAT.

1,009,650.  Specification of Letters Patent.  Patented Nov. 21, 1911.

No Drawing.  Application filed August 7, 1911.  Serial No. 642,653.

*To all whom it may concern:*

Be it known that we, GEORGE DELIUS and CHARLES P. TATRO, citizens of the United States, residing at Seattle, in the county of King and State of Washington, have invented certain new and useful Improvements in Preserving Meat, of which the following is a specification.

This invention relates to means for preserving from fly blow or infection of any kind, meats, such as bacon, ham, sausages, etc., which have been cured by any process, such as pickling, smoking, etc., and its object is to cover each piece of meat with a protective coating which shall be impervious to air, moisture, and insects and yet be sufficiently tough and elastic to endure the usual handling in transportation without being cracked or peeled off, and it consists in the process of preserving meats hereinafter more fully described and particularly stated in the claims.

The pieces of meat to be protected by this process are first to be cured by pickling, smoking, or any analogous means, and then dipped in a bath of gelatin mixed with a small percentage of glycerin and water. For the preservation of small pieces of some kinds of meat this one dipping might fill the pores and form a sufficient coating to give the protection desired, but it is our usual practice to give a second dipping in the same bath after the first coating has become congealed. The gelatin and glycerin are in no way unhealthy when mixed with food. In fact, they are extensively used as gravy stock in restaurants, therefore it is desirable that the coating also be protected from infection. This we do by hanging the meat, while the coating is congealing and drying, in a room the atmosphere of which is sterilized by ozone. The meat being protected by the said coating, cannot be injured by the chemicals used to produce the ozone. For further protection the coated meat is dipped in an aqueous solution of silicate of soda which forms an overcoat that is impervious to air and moisture and the completed coating protects the meat from bacteria, and microbes, and from any foul air that it may encounter in transportation, and entirely prevents both mold and fly blow. To toughen and render more elastic the coating of silicate we may add to it in solution about two per cent. of glycerin. The united coating is sufficiently tough and elastic to stand the usual handling without being cracked or peeled off. It is transparent and glossy, showing the character of the inclosed meat very attractively. The coating may be entirely removed by dipping in hot water, but if it is desired to use the meat by cutting off a few slices at a time the consumer need pay no attention to the coating because the small amount melted off in the frying pan produces no discoverable taste.

This process of preserving meat is simple, easy, rapid and inexpensive, and a sure preventive against fly blow or other taint.

We claim:

1. In the process of preserving meat, the steps which comprise coating the meat with a mixture of gelatin and glycerin, and drying the coating in ozonized atmosphere.

2. In the process of preserving meat, the steps which comprise coating the meat with a mixture of gelatin and glycerin, and then overcoating it with silicate of soda.

3. In the process of preserving meat, the steps which comprise coating the meat with a mixture of gelatin and glycerin, and then overcoating it with a mixture of silicate of soda and glycerin.

4. The process of preserving meat, which consists first, in covering the meat with a coating of mixed gelatin and glycerin, second, in placing the coated meat in ozonized atmosphere to congeal and dry the said coating and third, in overcoating with silicate of soda, the meat thus coated and dried.

In testimony whereof we affix our signatures in presence of two witnesses.

GEORGE DELIUS.
CHARLES P. TATRO.

Witnesses:
L. B. STEDMAN,
WILLIAM E. KRAFFT.